United States Patent
Atiq (10) Patent No.: US 11,443,366 B2
(45) Date of Patent: Sep. 13, 2022

(54) SYSTEMS AND METHODS FOR REAL TIME ONLINE TO OFFLINE (O2O) SHOPPING IN AND MESSAGING TO PHYSICAL RETAIL STORES

(71) Applicant: Loungeing, Inc., New York, NY (US)

(72) Inventor: Rehan Atiq, London (GB)

(73) Assignee: Loungeing, Inc., New York, NY (US)

( * ) Notice: Subject to any disclaimer, the term of this patent is extended or adjusted under 35 U.S.C. 154(b) by 0 days.

(21) Appl. No.: 17/127,036

(22) Filed: Dec. 18, 2020

(65) Prior Publication Data

US 2021/0192607 A1 Jun. 24, 2021

Related U.S. Application Data

(60) Provisional application No. 62/949,758, filed on Dec. 18, 2019.

(51) Int. Cl.
G06Q 30/06 (2012.01)
G06Q 30/02 (2012.01)

(52) U.S. Cl.
CPC ..... *G06Q 30/0643* (2013.01); *G06Q 30/0239* (2013.01); *G06Q 30/0639* (2013.01)

(58) Field of Classification Search
CPC ........... G06Q 30/0643; G06Q 30/0239; G06Q 30/0639
USPC ...................................................... 705/27.2
See application file for complete search history.

(56) References Cited

U.S. PATENT DOCUMENTS

| | | | |
|---|---|---|---|
| 5,465,291 A | 11/1995 | Barrus et al. | |
| 8,046,259 B1 * | 10/2011 | Siegel | G06Q 30/0277 705/14.73 |
| 9,984,386 B1 * | 5/2018 | Bhatia | G06Q 30/0241 |
| 2001/0029465 A1 | 10/2001 | Strisower | |
| 2002/0059196 A1 * | 5/2002 | l'Anson | G06Q 30/06 |
| 2002/0072974 A1 | 6/2002 | Pugliese, III et al. | |

(Continued)

FOREIGN PATENT DOCUMENTS

WO WO-0140963 A1 * 6/2001 ............. G06Q 30/02

OTHER PUBLICATIONS

Sarah Perez "'Amazon Live' is the retailer's latest effort to take on QVC with live-streamed video." Feb. 8, 2019. Retrieved from: https://techcrunch.com/2019/02/08/amazon-live-is-the-retailers-latest-effort-to-take-on-qvc-with-live-streamed-video/ (Year: 2019).*

(Continued)

*Primary Examiner* — Yogesh C Garg
(74) *Attorney, Agent, or Firm* — Crowell & Moring LLP (57) ABSTRACT

A system, method, and non-transitory computer-readable medium provide a platform for shoppers to remotely search for products in physical stores and to communicate with store sales people. Shoppers and stores perform an onboarding process in which they enter personal, business and payment information, respectively, to enable use of the system. The platform allows shoppers to search for a particular product via a device application on a mobile communication device of the shopper by inputting a selected amount of search criteria such as a segment, a category, a sub category and associated brand, size, color and price range. Further, the platform allows shoppers to efficiently inquire about particular products and to purchase products in a single chat session with a store sales person remotely.

16 Claims, 7 Drawing Sheets

(56) References Cited

U.S. PATENT DOCUMENTS

| | | | |
|---|---|---|---|
| 2005/0097005 A1* | 5/2005 | Fargo | G06Q 30/0625 |
| | | | 705/26.62 |
| 2005/0114159 A1* | 5/2005 | Ozugur | G06Q 30/02 |
| | | | 705/7.22 |
| 2005/0220289 A1* | 10/2005 | Reding | H04M 7/006 |
| | | | 379/265.09 |
| 2012/0037700 A1* | 2/2012 | Walji | G06Q 10/087 |
| | | | 235/385 |
| 2012/0123890 A1* | 5/2012 | Nathan | G06Q 30/0601 |
| | | | 705/26.1 |
| 2012/0265697 A1* | 10/2012 | Tuchman | G06Q 30/016 |
| | | | 705/304 |
| 2013/0085888 A1 | 4/2013 | Kim et al. | |
| 2013/0311339 A1* | 11/2013 | Jeremias | G06Q 30/0601 |
| | | | 705/27.1 |
| 2014/0019290 A1* | 1/2014 | Beaver | G06Q 10/0833 |
| | | | 705/26.5 |
| 2014/0129370 A1 | 5/2014 | Mabrey et al. | |
| 2015/0112826 A1 | 4/2015 | Crutchfield, Jr. | |
| 2015/0287084 A1* | 10/2015 | Gura | G06Q 30/0633 |
| | | | 705/14.58 |
| 2017/0330234 A1* | 11/2017 | Caidar | G06Q 30/0623 |
| 2018/0246983 A1* | 8/2018 | Rathod | G06F 16/9535 |
| 2020/0134643 A1* | 4/2020 | Bucknell | G10L 15/18 |

OTHER PUBLICATIONS

Erlanger, Leon ,"Building VoIP Into the Business'" InfoWorld28. 26: 27-28,30-32. IDG Communications, Inc. (Jun. 26, 2006); retrieved from Dialog database on Jun. 25, 2022, (Year: 2006).*

International Search Report (PCT/ISA/220 & PCT/ISA/210) issued in PCT Application No. PCT/US2020/066057 dated Mar. 19, 2021 (three (3) pages).

Written Opinion (PCT/ISA/237) issued in PCT Application No. PCT/US2020/066057 dated Mar. 19, 2021 (10 pages).

Orendorff., "O2O Commerce: Conquering Online-to-Online Retail's Trillion Dollar Opportunity.", Shopify Plus. May 21, 2018 (May 21, 2018) Retrieved on Feb. 14, 2021(Feb. 14, 2021) from http://shoptfy.com/enterprise/o2o-online-to-offlinecommerce (eight (8) pages).

Sun et al., "Amassing and analyzing customer data in the age of big data: a case study of Haier's Online-to-Offline (O2O) business model.", Journal of Information Technology Case and Application Research 17.3-4 (2015) Dec. 14, 2015 Retrieved on Feb. 14, 2021, pp. 156-165, http://wwwtandfonline.com/doi/abs/10.15228053.2015.1095017 (12 pages).

International Preliminary Report on Patentability (PCT/IB/326 & PCT/IB/373) issued in PCT Application No. PCT/US2020/066057 dated Jun. 30, 2022, (Written Opinion (PCT/ISA/237), filed on Jul. 20, 2021 (12 pages).

* cited by examiner

SYSTEMS AND METHODS FOR REAL TIME ONLINE TO OFFLINE (O2O) SHOPPING IN AND MESSAGING TO PHYSICAL RETAIL STORES

CROSS REFERENCE TO RELATED APPLICATION

This application claims priority under 35 U.S.C. § 119 from U.S. Patent Application No. 62/949,758, filed Dec. 18, 2019, the entire disclosure of which is herein expressly incorporated by reference.

BACKGROUND AND SUMMARY OF THE INVENTION

The present invention is directed to a real time, remote messaging and transaction system and method between remote shoppers and physical stores on a digital commerce platform, via data embedded in their inventory pictures.

The platform enables shoppers to search and discover items based on their chosen criteria and identify the precise store(s) where the relevant items are available. Shoppers may then remotely communicate with a store representative, using Talk To Store (TTS) features (such as chat, VoIP, and video calling), directly in real time and remotely conclude a transaction (payment, delivery, return) with a physical store. Products in stores can also be discovered via inventory pictures posted by third parties (other shoppers and social media influencers) with relevant data embedded in them and also by receiving the relevant inventory pictures (as they are added on the platform) due to matching of their notification preferences and characteristics of data embedded in them by the third party. The TTS features compresses the time to sale as online to offline (O2O) communication with stores resembles in-person presence in the store.

Figure 1:
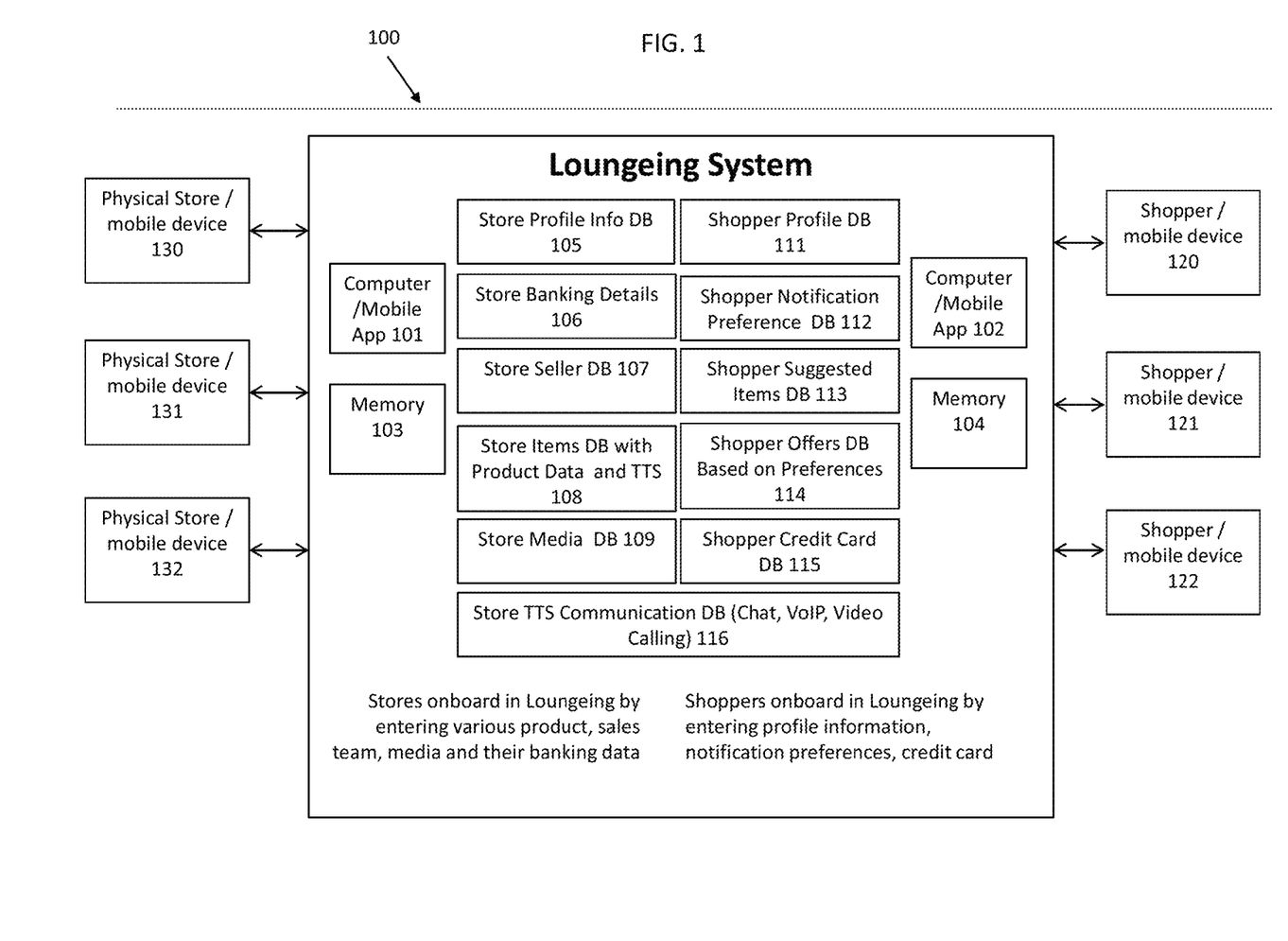
FIG. 1 illustrates a schematic block diagram of a system according to an exemplary embodiment of the present invention.
Figure 2:
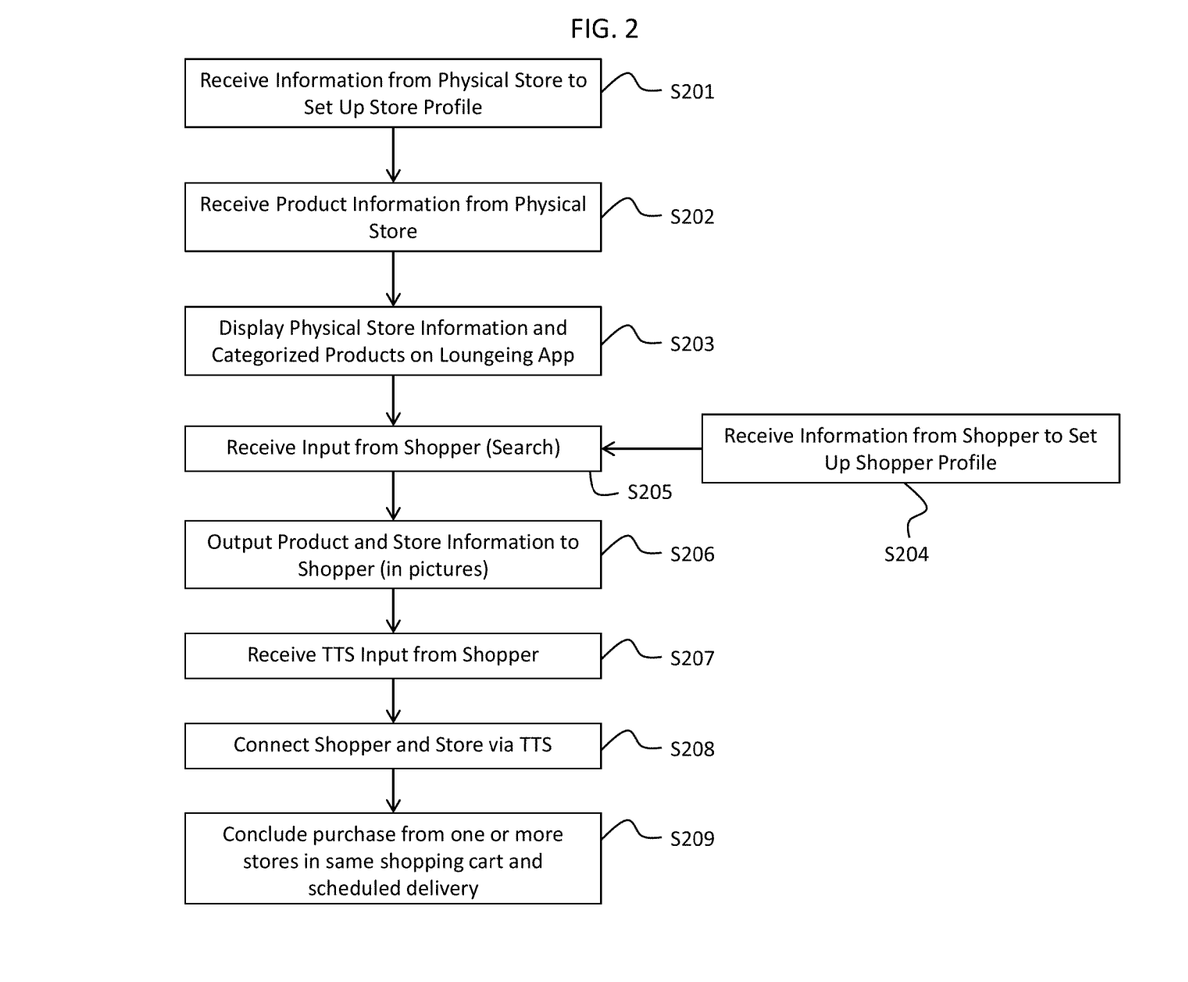
FIG. 2 illustrates a method according to an exemplary embodiment of the present invention.

The present invention relates to a first of its kind digital commerce platform called Loungeing for physical stores (not their websites) and shoppers to directly discover, engage and transact with each other remotely (FIGS. 1 & 2). In other words, Loungeing is a physical retail shopping internet. It is a building block which is needed to provide many kinds of digital capabilities to physical retail stores which on their own cannot create such capabilities in the existing architecture of the Internet as we know it. The system contains product categories and attribute databases from which a physical store can select pertinent ones and embed them to specific inventory pictures and then place them in its profile on the Loungeing platform. Once the store's physical inventory is mapped to specific product categories and attributes, the product and hence store can be discovered when a shopper on the platform searches for a product based on the same categorizations. These product-to-database mappings (FIG. 3) can be modified in real time by the physical store depending on product's availability in the store. As the data-embedded inventory pictures are placed in a store profile a Talk-To-Store (TTS) button is automatically placed below them by the Loungeing system, which opens a direct communication channel between the shopper and the store representative. These inventory pictures can also be pushed to specific shopper profiles based on the shopper preferences (FIG. 4) and are also sent to specific marketers in the platform who can market them to their audience on other platforms such as Instagram or YouTube and drive them into the platform. The store can also create profiles of sellers (FIG. 5), which are authorized to be part of a TTS team and can engage and market on behalf of the store from the platform directly to shoppers. They can respond in real time via TTS functionalities (chat, VoIP, Video calls) from various locations (inside the store or outside).

The shoppers or marketers (third party) can also post pictures of items in the Loungeing platform. When posting a picture, the picture-owner must choose specific product categories and attributes and a store to tag them to, all of which is embedded in the picture. This process connects the picture to product category databases, to a specific physical store and hence to the sales representatives who are attached to that store. The picture-owner is given a choice of where the picture should appear within the platform—their own profile only or also in general product category rooms where other pictures with similar product categories taken by other shoppers are posted. Posting in product category rooms increases the chances of discoverability and hence the number of views the picture gains and hence of the store and products embedded in the picture.

To then enable direct shopper-to-store seller communication for the third party pictures, once the picture is discovered in their Social Tab (FIG. 6), the Loungeing application places a "Talk to Store" button located under the picture as it is released on the platform. The "Talk to Store" button is clickable by any shopper on the platform (in any geography, at any time) who discovers the picture during his/her search for a specific product. The "Talk to Store" button enables any shopper to directly message (chat, VoIP or video call) sellers attached to the store to obtain additional information about a product and if they decide, purchase it in the same chat session, since shoppers' credit card and stores' banking details are received by the Loungeing system during sign up. Any shopper can add their payment details as they do on other platforms (e.g. Uber).

By placing the "Talk to Store" button on a picture with a product, store and sales person data embedded in it, over a searchable platform, the Loungeing system provides a unique and efficient channel of online-offline communication between two remote, unrelated parties and enables sales between a remote shopper and physical store seller who may be in close vicinity of each other or in completely different parts of the world. This end to end process is not possible today on any digital platform.

A store may also choose to send offers of their products (discounts, new arrival pricing and the like) which are received by shoppers based on their notification preference, and a TTS button is included in the offer and enables shoppers to instantly communicate with the store sales representative. Today such offers from a physical store mostly come via e-mail to those shoppers who are part of their existing customer database.

Other objects, advantages and novel features of the present invention will become apparent from the following detailed description of one or more preferred embodiments when considered in conjunction with the accompanying drawings.

DETAILED DESCRIPTION OF THE DRAWINGS

FIG. 1 illustrates a schematic block diagram of a system according to an exemplary embodiment of the present invention. As illustrated in FIG. 1, the Loungeing system includes a memory, a plurality of databases and other stored information that are processed by a computer, central processing unit (CPU), processor, microprocessor or the like that is specifically programmed to execute the programs stored in memory to perform the processes and methods described herein for setting up profiles of shoppers and physical stores, executing searches for products, and enabling real time communication and sales between shoppers and physical store sales people. As illustrated in FIG. 1, the Loungeing System includes a plurality of computers/mobile applications 101 and 102 and memories 103 and 104. Although only two of each are illustrated, it is to be understood that many more computers/mobile apps and memories may be include in the system.

The databases and other stored information in the Loungeing system illustrated in the exemplary embodiment of FIG. 1 include a Stored Profile Information Database (DB) 105, Store Banking Details 106 (these are placed in an online payment gateway (e.g., Stripe) account where the payment gateway connects any new store to the Loungeing Stripe account after their business information verification is completed and bank details are entered), Store Seller Database 107, Store Product Category Database 108 (created by importing data from the store inventory system in real time or by reading information from their website using a computer program in Loungeing), Store Media Database 109, Shopper Profile Database 111, Shopper Notification Preference Database 112, Shopper Suggested Item Database 113, Shopper Offers Database 114 (FIG. 4), Shopper Credit Card Database 115, and Store TTS communication Database 116. Other embodiments of the Loungeing system may include a different configuration of elements, depending on the desired configuration.

FIG. 1 illustrates three shoppers 120, 121, and 122 and three physical stores 130, 131, and 132 for the sake of simplicity and clarity, but it is to be understood that the numbers of stores and shoppers can be in the thousands, millions or more. The physical stores and shoppers can communicate through the Loungeing system via any known wireless or wired network (e.g., Internet, WiFi, Bluetooth, LAN, cellular, etc.) and communication devices (e.g., mobile devices).

FIG. 2 illustrates a method according to an exemplary embodiment of the present invention. Initially, an onboarding process for physical stores and shoppers is required in order to obtain their specific information to enable the interactions via the Loungeing platform. During onboarding, all information necessary for a physical store to make its merchandise discoverable remotely, communicate with shoppers via sales persons and for shoppers to communicate with stores' sales persons and make purchases is provided to the Loungeing system by store personnel and shoppers, respectively, as further described below. In step S201, the Loungeing platform receives information a physical store to set up the store profile. This includes their name, address, contact details and information concerning their bank account connection to Loungeing using a payment gateway (e.g., Stripe) and the like. This also requires the store representative to go through a Know Your Customer (KYC) process. In step S202, the store sends Loungeing detailed product data either in a spreadsheet (e.g., Excel) format or an application programming interface (API) which enables reading the product data from their website or inventory system. This includes SKU level data with over various attributes associated with each SKU (segment, gender, category, subcategory, brands, size, price, etc.)

After onboarding, store information is available on the Loungeing application and shoppers and stores can interact with each other using the Loungeing application on their mobile communication devices or other computing devices. In step S203 of the method illustrated in FIG. 2, the physical store information is displayed on the Loungeing application along with a categorized list of products. In step S204, information is received from a shopper to set up the shopper's profile in the Loungeing application. As described above, this information may be received from, for example, a mobile communication device of the shopper. In step S205, the Loungeing application receives an input from the shopper via which the shopper can search for a particular product via the Loungeing application. In step S206, product and store information related to the search is output to the shopper in response to the input from the shopper.

Stores' and shoppers' data can be updated in real-time. For example, if a new shoe arrives in a store in the morning, it can be added into the Loungeing system instantaneously by the store itself (with the relevant attributes) and be instantly discoverable by shoppers globally who may not even know about the store. This is currently not possible with conventional online systems and certainly not possible in offline. The search function on the Loungeing application enables a shopper to find the store with the relevant item. Stores and shoppers can communicate directly if the shopper wants to inquire about or purchase any item from the store. In step S207, for example, the store receives a "Talk to Store" (TTS) input from the shopper via a TTS button (menu item) in the Loungeing application. In step S208, the shopper and the store are connected via a TTS communication link established in response to receiving the TTS input from the shopper. The TTS button is placed below every picture posted by the store or the shopper to enable messaging between the store and the shopper smoothly once that picture is discovered by a shopper.

The Loungeing TTS button is designed to create a digital communication link/live chat session (e.g., Chat, VoIP, or Video Call) between two otherwise unrelated parties using product data embedded in the pictures (FIG. 3) in the Loungeing application. As described herein, the system in Loungeing has created a standard protocol (for data input of inventory, which not only includes product attributes, but also sales representatives in that store) which is applied to how a store categorizes its products, how a picture embeds product data during posting and how a shopper searches for such items in order to shop. They all work on the same protocol.

The TTS button is a digital link placed below such pictures which connect the person looking for a product with a seller in the store where the picture was taken in the form of a live communication session (e.g., Chat, VoIP or Video Calling). This session can exchange information, additional pictures of the item and even a payment link to conclude a purchase/payment transaction. The entire interaction, if done today in the physical world (search in physical stores, engage with a seller, review various items, decide to pay), could take hours and may be impossible if the store is in one country and the shopper in another country, as it is not possible to do it remotely. Alternatively, looking for a specific store which has the exact product a shopper wants is not generally possible, especially if the store is not known to the shopper. And even if discovered on the Internet, it is not generally possible or convenient to communicate with the store remotely (trying to call or send e-mail), especially if store is in another location. The TTS button greatly compresses the time it takes to connect a shopper with a specific need with a relevant physical store seller remotely to exchange relevant information and conclude a purchase. In Step S209, the purchase of the desired product(s) can be completed in the same shopping cart from multiple stores with one payment to Loungeing. After receiving a payment from the shopper, the Loungeing system automatically distributes the appropriate payment(s) to the appropriate store(s) via the online payment platform.

Figure 3:
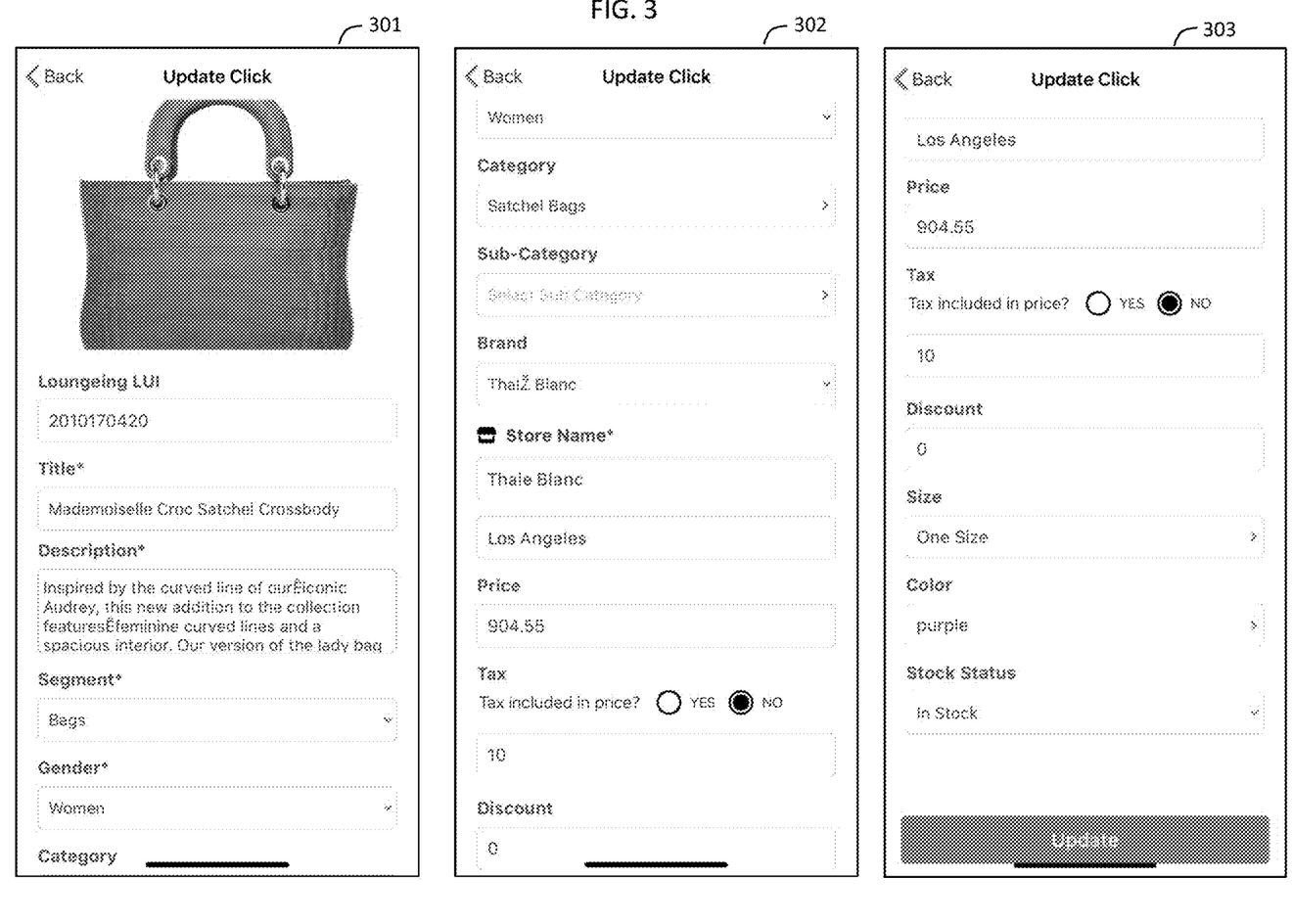
FIG. 3 illustrates a user interface for an exemplary embodiment of a physical store product mapping process including a plurality of menu screens in the Loungeing application through which a store employee is able to add, delete or modify product characteristic of the embedded data based on what is in the physical store.

FIG. 3 illustrates a user interface for an exemplary embodiment of a physical store product mapping process including a plurality of menu screens in the Loungeing application through which a store employee is able to add product attributes for a specific item in the store. A specific product category can be mapped from the store into the Loungeing platform by selecting a segment, a category, a sub category and associated brand, size, color, price range and the like. As this process is repeated for multiple product segments, it creates a list of categories which reflect the store inventory. This can be modified at any time by the store. Shoppers can find the store based on a search in the Loungeing application for a product segment, category, sub-category, etc., and the search can match the selected store categories all the way down to size/color if desired. As illustrated in FIG. 3, menu screen 301 illustrates an exemplary product (Mademoiselle Croc Satchel Crossbody) for which an employee enters product attributes, such as a description, segment, gender and the like. Menu screens 302 and 303 illustrate additional menu screens in which the employee can enter information including category, sub-category, brand, price, tax information, discount information, size, color, stock status, and the like. Thus, any shopper looking for "women/bags/satchel," for example, will see this item and can talk to a Thale Blanc (in Los Angeles) sales representative if they so choose. The shopper can be in LA, NYC, London or anywhere remote. Hence an offline connection is made remotely with a store representative (as if the shopper was inside the store). If a representative is not available, they can write or call back at a mutually convenient time.

Figure 4:
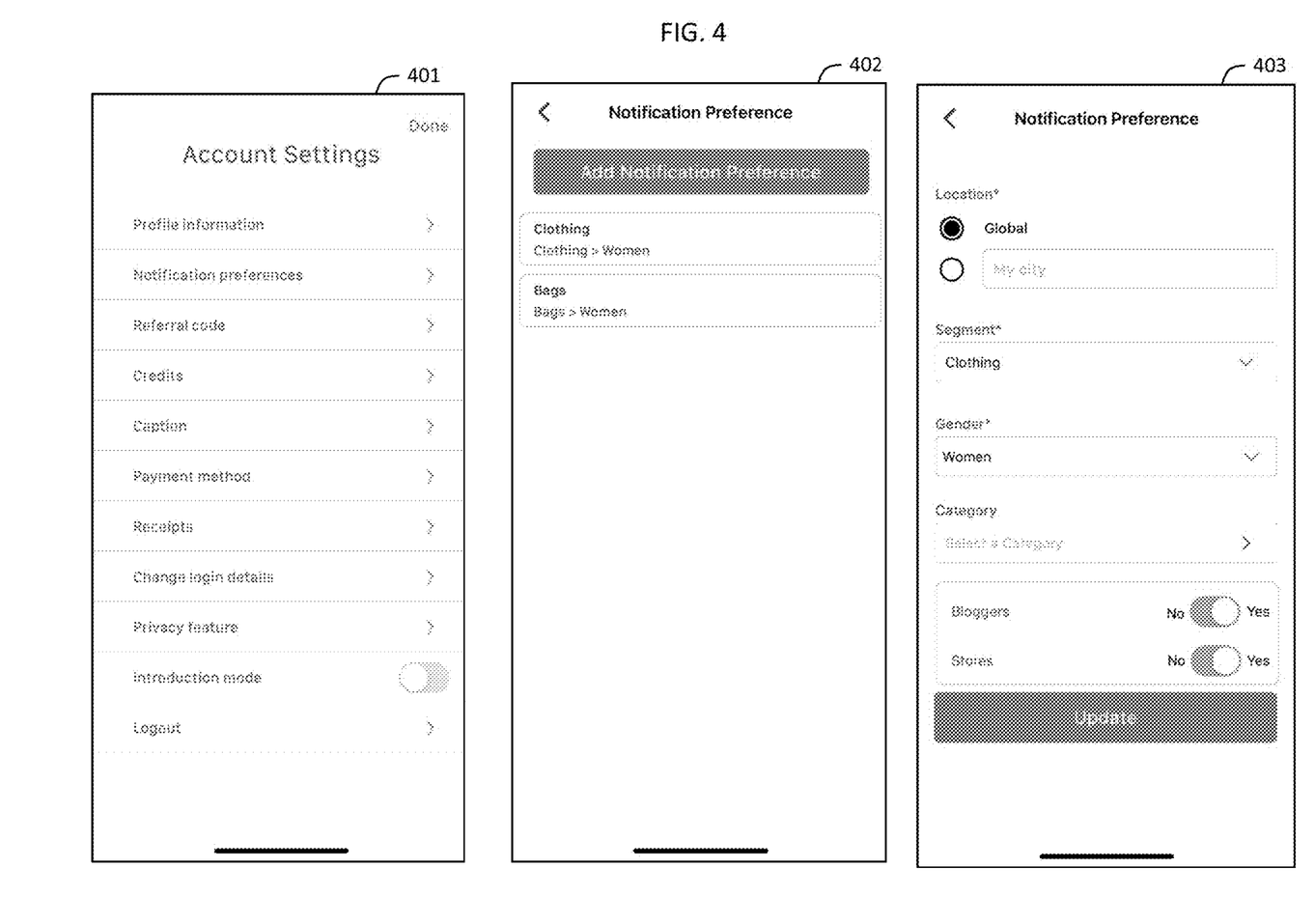
FIG. 4 illustrates a user interface for an exemplary embodiment of a shopper notification preferences which can be created to automatically receive data embedded product pictures with TTS functionality from physical stores store.

FIG. 4 illustrates a user interface for an exemplary embodiment of a shopper notification selection process in the Loungeing application. In menu screen 401, the shopper, in their account settings, is able to select notification preferences, which in menu screen 402, allows the shopper to input notification preferences for particular products (e.g., clothing and bags). As illustrated in menu screen 403, the shopper selects global notifications for women's clothing (e.g., from bloggers and/or stores). This selection enables shoppers to receive new items that a store adds in the Loungeing platform automatically even without searching for them. Hence, a shopper is now able to see items in physical stores remotely even if he/she did not know about those stores and never visited them. Current platforms such as Google, Amazon, Instagram, Facebook and other marketplaces do not enable physical stores to connect into a digital network where their inventory is instantaneously discoverable by shoppers looking for the specific items which are present in a specific store, communicate with the store representative from anywhere, and conclude a purchase from within the same platform and get the item delivered to them. Platforms like Google present only websites, they do so based on the amount that a seller is paying them, and they do not enable any communication, payment or delivery to the shopper. In Loungeing, time to discover the new items in physical world is compressed to "instantaneous" versus if it was searched for in the physical world, or the discovery may not happen if the new items are on a website which the shopper does not know about.

Figure 5:
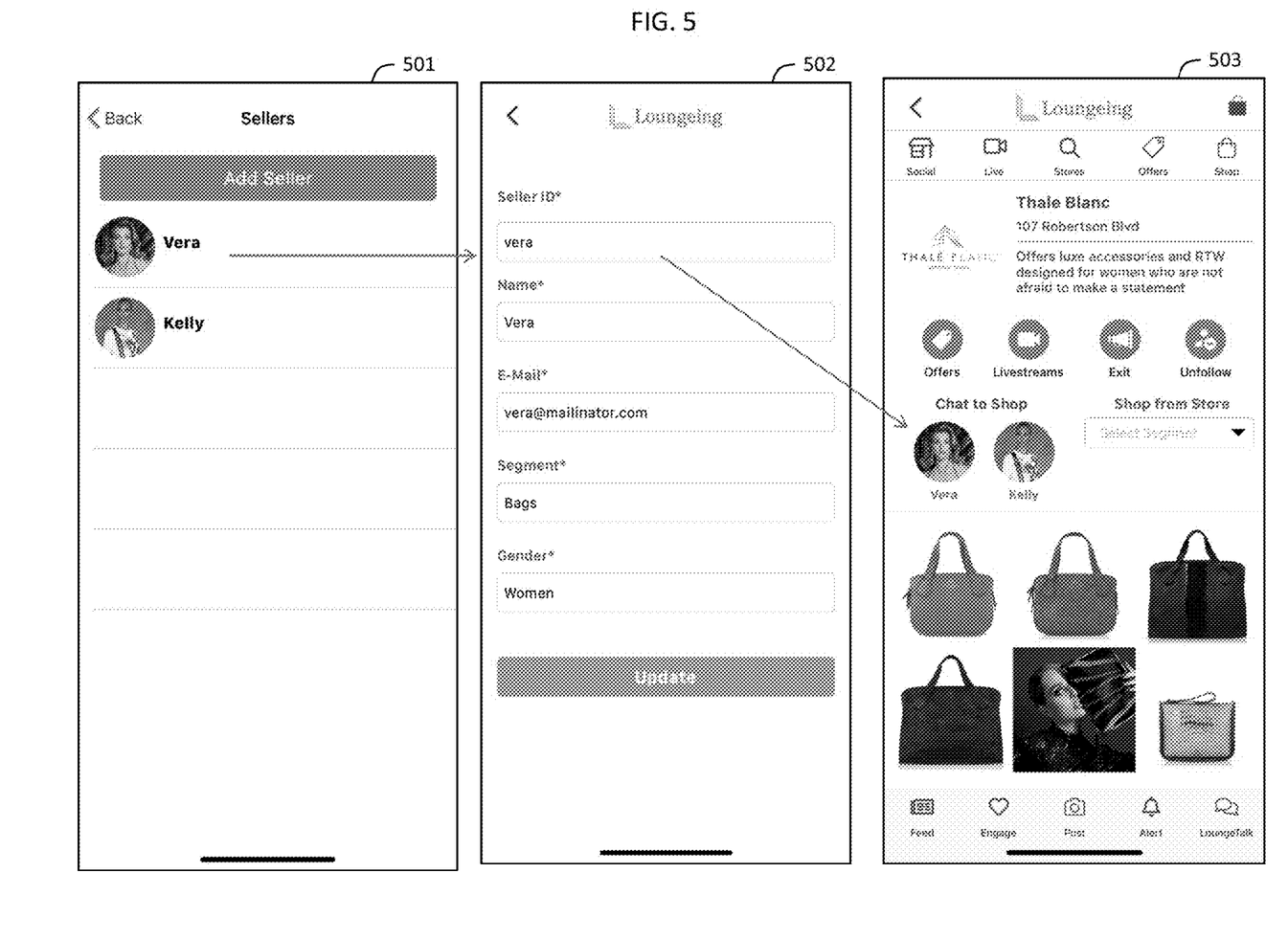
FIG. 5 illustrates a user interface for an exemplary embodiment of a store sales team mapping process including a plurality of menu screens in the Loungeing application displaying the information of a store employee who may be available to assist shoppers.

FIG. 5 illustrates a user interface for an exemplary embodiment of a store sales team mapping process including a plurality of menu screens in the Loungeing application displaying the information of a store employee who may be available to assist shoppers. A physical store can select a seller (store employee) to be added who is embedded in the profile as shown in menu screen 501. The seller receives an email that the store sends with a code to log in. Once the seller logs in and inputs his/her profile data (menu screen 502), they are automatically attached to the store profile and become part of the communication channel with any incoming inquiry from a shopper when they press the "Talk to Store" button or simply click on the seller picture on the store profile to begin a communication session. Menu screen 503 shows once the seller has been attached to the store after they log in, and displayed as part of the store profile home in the Loungeing application.

Figure 6:
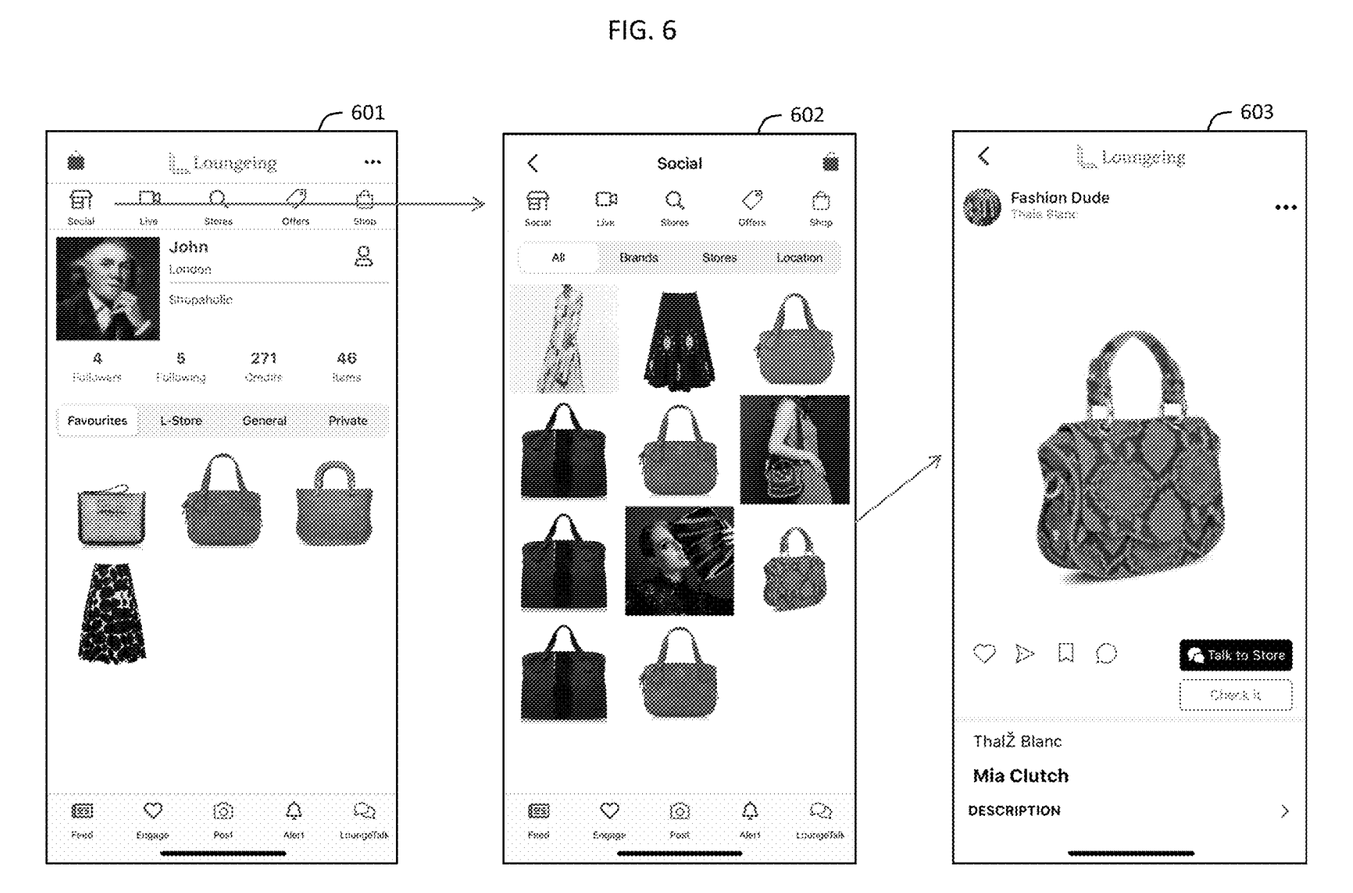
FIG. 6 illustrates the user interface available to a shopper to discover the third party product pictures which have category and attribute data embedded in them based on their notification preferences.

FIG. 6 illustrates a user interface where any pictures posted by other shoppers in Loungeing appear if they match the notification preference(s) of the user. As shown in menu screen 601, shoppers can repost pictures from an existing store profile or place their own pictures during a repost which represent the product they are reposting from a specific store. In menu screen 602, shoppers can assign relevant categories and attributes to that picture and it links to a specific store and product in that store in the Loungeing system. Hence, as shown in menu screen 603, shoppers see items in a way other shoppers are using them and can press the "Check it" button on these pictures to be directed to the specific store where this item is presented. Alternatively, they may press the "Talk to Store" button from a third party picture and begin interactive communication with the store from there.

Figure 7:
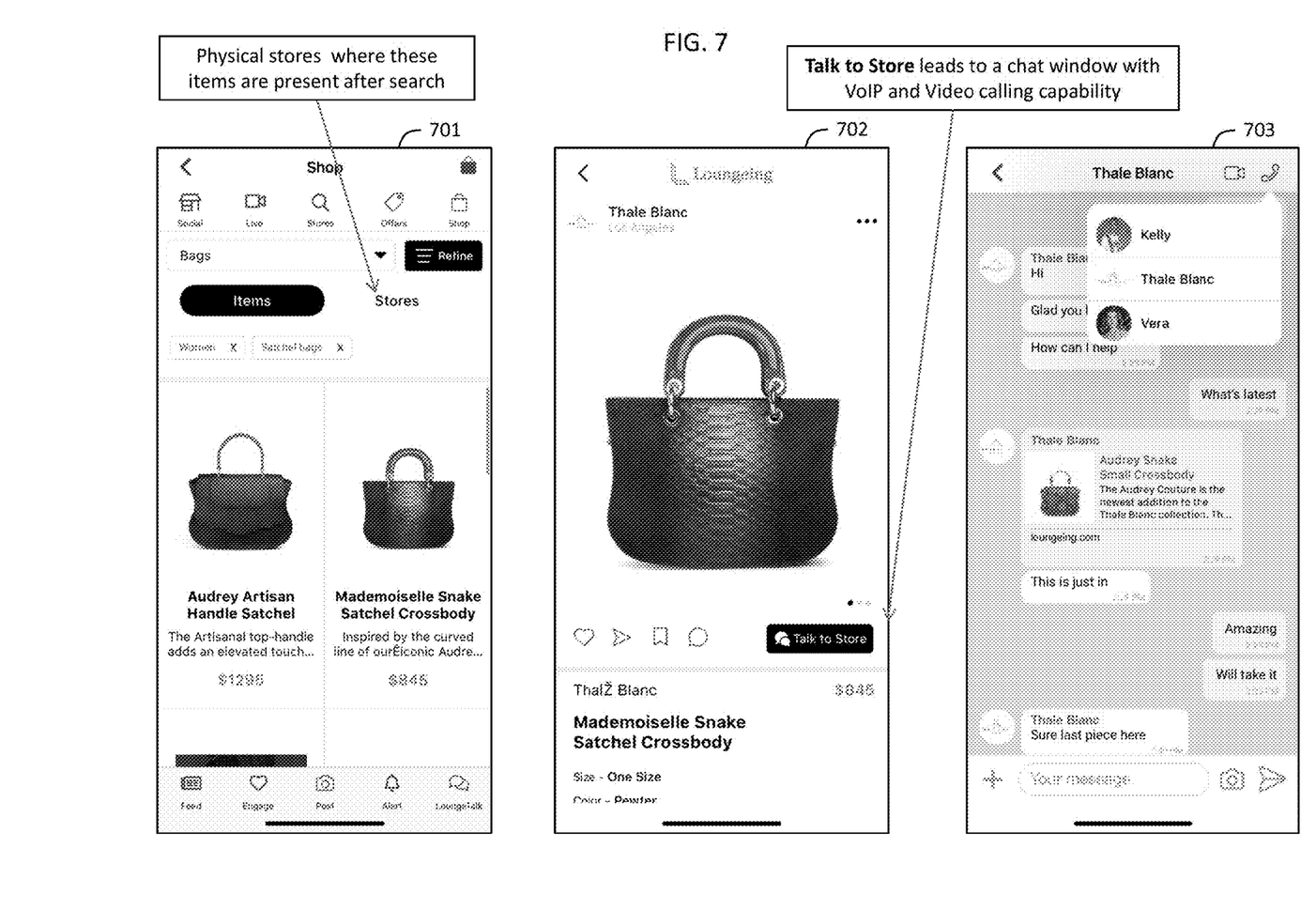
FIG. 7 illustrates a user interface available to a shopper to search for items and discover the stores in which they are present, use the TTS functionality to begin a remote communication channel with physical store representative and potentially conclude a purchase.

FIG. 7 illustrates a user interface for an exemplary embodiment of a method for a shopper to search for a specific item and purchase the item from a physical store using the Loungeing application. The shopper searches for an item, for example, "Women's/BAGS/Satchel Bags" and 10 items show up. As illustrated in menu screen 701 of FIG. 7, the shopper clicks on a picture from Thale Blanc. As the shopper selects a particular picture which is linked to a store, the "Talk to Store" button is then displayed in menu screen 702 near the selected picture to allow the shopper to directly contact a sales person at the store. As illustrated in menu screen 703, the shopper then begins a communication session in real time with the sales person in the store remotely. The seller sends the shopper a specific picture of a pink bag. The seller informs the shopper that it is the last piece in stock and the shopper decides to buy it instantaneously. The seller pastes a payment link in the same communication session which directs the shopper to the product page and payment via an already entered credit card, thereby concluding a transaction remotely from a physical store.

As described above, the present invention provides a number of technical improvements over conventional systems and methods through which a shopper and physical store seller interact today. In particular, the present invention provides a new, unique and highly efficient system and method for connecting shoppers and physical stores (their representatives) throughout the world in a user-friendly manner that allows shoppers to discover the relevant store and sellers to directly communicate with them and complete purchases in a single chat session. Additionally, the platform enables shoppers to search the inventory of physical stores to find products of interest even in a case in which the seller is geographically unreachable by the shopper.

More generally, various processor-enabled features of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as a floppy disk, CD-ROM, hard drive, USB (universal serial bus) drive, magnetic tape, any other magnetic medium, a CD-ROM, any other optical medium, punch cards, paper tape, any other physical medium with patterns of holes, a RAM, a PROM, an EPROM, a FLASH-EPROM, any other memory chip or cartridge, any other medium from which a computer can read, or any other machine-readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for communication between a shopper and a physical store, the method comprising:
    displaying physical store information and categorized product information in a computer application;
    receiving an input from a mobile communication device of the shopper via the computer application indicating a product of interest to the shopper;
    outputting selected product information about the product of interest, selected physical store information indicating a physical store that is selling the product of interest, a particular salesperson who is currently selling the product of interest at the physical store, and a talk-to-store button embedded in a picture of the product of interest, to the mobile communication device of the shopper via the computer application based on the input received from the shopper;
    receiving a talk-to-store request for real time digital communication with the particular salesperson at the physical store via the computer application from the mobile communication device of the shopper in relation to the selected product information and the selected physical store information, wherein the talk-to-store request is activated by pressing the talk-to-store button on a screen of the mobile communication device, and the talk-to-store button is linked to the selected product information and the selected physical store information; and
    establishing a real time digital communication session between a communication device of the particular salesperson at the physical store and the mobile communication device of the shopper based on the talk-to-store request, during which the particular salesperson provides additional product information to the shopper; and
    receiving and storing, in the computer application, pictures from other shoppers and third parties, wherein the physical store information of the physical store is embedded in the pictures by the computer application;
    wherein the real time digital communication session comprises at least one of Chat, VoIP, and video calling.

2. The method according to claim 1, further comprising: completing a purchase of the product of interest by the shopper via the computer application.

3. The method according to claim 1, wherein the selected physical store information includes a list of physical stores that have the product of interest available for purchase.

4. The method according to claim 1, further comprising: receiving updated product information from the physical store that performs at least one of adding, removing and changing products and product attributes, wherein the updated product information is instantly discoverable by the shopper via at least one of search filters and predefined notification preferences.

5. The method according to claim 1, further comprising: updating the physical store information to add or remove particular representatives from a list of representatives that are available for the real time digital communication session.

6. The method according to claim 1, further comprising: sending at least one of offers and alerts from the physical store to the shopper based on predetermined preferences of product attributes of the shopper.

7. The method according to claim 6, wherein the predetermined preferences of the product attributes of the shopper include at least one of a product segment, a gender, a product category, a product sub category, a location of the physical store, a brand of the product of interest, a color of the product of interest.

8. The method according to claim 1, wherein the pictures are received via the real time digital communication session.

9. The method according to claim 1, wherein the talk-to-store button is displayed adjacent to the selected product information, and in response to selection of the product of interest.

10. The method according to claim 1, wherein the real time digital communication session is opened within the computer application of the mobile communication device.

11. A non-transitory computer-readable medium storing a program, which when executed by a computer, causes the computer to perform a method for communication between a shopper and a physical store, the method comprising:
displaying physical store information and categorized product information in a computer application;
receiving an input from a mobile communication device of the shopper via the computer application indicating a product of interest to the shopper;
outputting selected product information about the product of interest, selected physical store information indicating a physical store that is selling the product of interest, a particular salesperson who is currently selling the product of interest at the physical store, and a talk-to-store button embedded in a picture of the product of interest, to the mobile communication device of the shopper via the computer application based on the input received from the shopper;
receiving a talk-to-store request for real time digital communication with the particular salesperson at the physical store via the computer application from the mobile communication device of the shopper in relation to the selected product information and the selected physical store information, wherein the talk-to-store request is activated by pressing the talk-to-store button on a screen of the mobile communication device, and the talk-to-store button is linked to the selected product information and the selected physical store information; and
establishing a real time digital communication session between a communication device of the particular salesperson at the physical store and the mobile communication device of the shopper based on the talk-to-store request, during which the particular salesperson provides additional product information to the shopper; and
receiving and storing, in the computer application, pictures from other shoppers and third parties, wherein the physical store information of the physical store is embedded in the pictures by the computer application;
wherein the real time digital communication session comprises at least one of Chat, VoIP, and video calling.

12. The non-transitory computer-readable medium according to claim 11, wherein the talk-to-store button is displayed adjacent to the selected product information, and in response to selection of the product of interest.

13. The non-transitory computer-readable medium according to claim 11, wherein the real time digital communication session is opened within the computer application of the mobile communication device.

14. A system for communication between a shopper and a physical store, the system comprising:
a memory; and
a processing device, coupled to the memory, wherein the processing device is configured to:
display, on a mobile communication device of the shopper, physical store information and categorized product information in a computer application;
receive an input from the mobile communication device of the shopper via the computer application indicating a product of interest to the shopper;
output selected product information about the product of interest, selected physical store information indicating a physical store that is selling the product of interest, a particular salesperson who is currently selling the product of interest at the physical store, and a talk-to-store button embedded in a picture of the product of interest, to the mobile communication device of the shopper via the computer application based on the input received from the shopper;
receive a talk-to-store request for real time digital communication with the particular salesperson at the physical store via the computer application from the mobile communication device of the shopper in relation to the selected product information and the selected physical store information, wherein the talk-to-store request is activated by pressing the talk-to-store button on a screen of the mobile communication device, and the talk-to-store button is linked to the selected product information and the selected physical store information; and
establish a real time digital communication session between a communication device of the particular salesperson at the physical store and the mobile communication device of the shopper based on the talk-to-store request, during which the particular salesperson provides additional product information to the shopper; and
receive and store, in the computer application, pictures from other shoppers and third parties, wherein the physical store information of the physical store is embedded in the pictures by the computer application;
wherein the real time digital communication session comprises at least one of Chat, VoIP, and video calling.

15. The system according to claim 14, wherein the talk-to-store button is displayed adjacent to the selected product information, and in response to selection of the product of interest.

16. The system according to claim 14, wherein the real time digital communication session is opened within the computer application of the mobile communication device.

* * * * *